United States Patent [19]

Beers

[11] 4,047,747
[45] Sept. 13, 1977

[54] AIR DRAG REDUCER FOR MOTOR FREIGHT VEHICLES

[75] Inventor: Charles James Beers, Bradenton, Fla.

[73] Assignee: LDV Industries, Inc., Bradenton, Fla.

[21] Appl. No.: 639,882

[22] Filed: Dec. 11, 1975

[51] Int. Cl.² .............................................. B60J 9/04
[52] U.S. Cl. .................................................. 296/1 S
[58] Field of Search ................... 296/1 S, 91; 105/2 R, 105/2 A, 2 B

[56] References Cited

U.S. PATENT DOCUMENTS

| 2,122,422 | 7/1938 | Huet | 105/2 A |
| 2,863,695 | 12/1958 | Stamm | 296/1 S |
| 3,241,876 | 3/1966 | Saunders | 296/1 S |
| 3,309,131 | 3/1967 | Saunders | 296/1 S |
| 3,348,873 | 10/1967 | Saunders | 296/1 S |
| 3,695,673 | 10/1972 | Meadows | 296/1 S |
| 3,929,369 | 12/1975 | Blair | 296/91 |
| 3,947,065 | 3/1976 | Geiger | 296/1 S |
| Re. 28,652 | 12/1975 | Baldfell | 296/1 S |

Primary Examiner—Robert R. Song
Assistant Examiner—R. Schrecengost

[57] ABSTRACT

This invention pertains to the reduction of air drag on trucks and truck tractor-semitrailer combination vehicles when they are driven on open highways. It consists of a short thick airfoil mounted by struts above the cab of the using vehicle. The airfoil is made by forming upper and lower surface skins by conventional means of metal or plastic and joining them with internal ribs. Metal or plastic struts are used to adjustably attach the airfoil to and above the cab of the using vehicle. This invention uses both the upper front and the lower rear surface of the airfoil to create air flow patterns which result in reduced air drag. This invention may be used with vehicles of different sizes and may also be oriented so that it does not increase air drag when used on a truck tractor which is either traveling with no semitrailer or is coupled to a low or flat-bed semitrailer.

1 Claim, 7 Drawing Figures

AIR DRAG REDUCER FOR MOTOR FREIGHT VEHICLES

BACKGROUND OF THE INVENTION

1. Field of the Invention

This invention relates to the field of transportation. More particularly, this invention relates to highway motor freight vehicles; it reduces the air drag on these vehicles, thus improving their efficiency. When attached to existing truck or truck tractor cabs, this invention changes air flow patterns around both the cab and the body behind the cab in such a fashion as to reduce turbulent air flow. The energy required to generate and sustain turbulence is thus reduced. Since turbulent air flow patterns serve no useful purpose, and since the energy to generate and sustain them is provided by the vehicles engines, their reduction improves the efficiency of these vehicles. Thus, vehicles using the present invention can either go faster with the same power or travel at the same speed with reduced power, or be operated using a combination of increased speed and reduced power.

2. Description of the Prior Art

So far as is known, the improved air drag reducer described and claimed herein has not been known before. The existence of air drag itself on highway vehicles, and particularly on truck tractor-semitrailer combinations, where the semitrailer is a closed van type, has been known nearly as long as the vehicles have been in use. A comprehensive study of air drag on truck tractor-semitrailer combinations and how to reduce it was performed in 1953 at the University of Maryland. That study, and others, showed that rounded corners, smooth surfaces, closing of the gap between the truck tractor and the semitrailer and similar design features would substantially reduce air drag on these vehicles. Rather than following these design principles, however, motor freight vehicles have subsequently been mostly designed to be more rather than less bluff; this has principally been the result of legal length limits. Concurrently, the Interstate highway system plus improved high horsepower engines have enabled these vehicles to be operated for long periods at sustained high speeds. The greater bluffness and higher speeds combine to increase air drag.

Several devices have been introduced to reduce this air drag. These include the device of U.S. Pat. No. 2,863,695 by Alexander F. Stamm, those of U.S. Pat. Nos. 3,241,876, 3,309,131, and 3,348,873 all by Walter Seldon Saunders, and that of U.S. Pat. No. 3,695,673 by James H. Meadows.

The apparatus of U.S. Pat. No. 2,863,695 employs air flow through conduits and thus differs markedly from the present invention, which employs air flow over exterior surfaces to achieve a reduction in air drag.

The devices and apparatus of the other Patents by Messrs. Saunders and Allen also differ from the present invention in several ways. The present invention is readily adjustable to provide a maximum of air drag reduction for a truck tractor when used with semitrailers of differing heights. The other inventions are only efficient for one increment of height difference between cab roof and semitrailer roof. Also, when a truck tractor with one of these other inventions installed is used in combination with a flat bed semitrailer or is driven with no semitrailer at all, drag is increased rather than decreased. The present invention is readily adjustable so that it does not increase air drag when it is mounted on a truck tractor which is either driven with no semitrailer or is used in combination with a flat bed or low bed semitrailer.

The present invention redirects air flow patterns in such a way as to produce substantially less force on the cab of the using vehicle at the attach points than certain of the devices described in Mr. Saunders Patents. Thus, the present invention does not require that the cab roof be reinforced as part of the installation procedure, as is necessary for these other devices.

The present invention differs from those of Messrs. Saunders and Allen in that their inventions utilize the front faces of airfoils to redirect air flow patterns, tolerating or even enhancing turbulence behind their devices. The present invention uses both upper front and lower rear faces of an airfoil to redirect air flow patterns and reduce turbulence in the region behind the airfoil.

The present invention attaches an airfoil above the vehicles cab roof such that a gap is maintained between the airfoil and the cab roof. This invention is configured so that air flows through this gap and is redirected with a reduction in turbulence over the following parts of the vehicle. This gap and the concomitant utilization of the lower rear surface of the airfoil to redirect air flow are of special importance in cross winds. Wind tunnel tests have shown that other cab top configurations and other devices mounted on cab roofs reduce air drag when there is a direct head wind but that they increase air drag when driving in a cross wind is simulated. The present invention does not increase air drag in a cross wind.

SUMMARY OF THE INVENTION

This invention relates to an improved air drag reducer for motor freight vehicles. More particularly, this invention reduces the air drag on those existing trucks and truck tractor-semitrailer combination vehicles which have closed van type bodies, when these vehicles are driven on open highways. It does this by redirecting air flow patterns over the vehicle. The most important of the several things this invention does is to convert the detached turbulent air flow region on the top and near the front of the cargo van body to a region of attached laminar air flow. This reduces air drag substantially. This invention is adjustable so that it can be readily shifted to perform this function for vehicles with a variety of vertical dimensional differences between cabs and cargo vans and for a wide range of gaps between the rear surface of the vehicles cab and the front face of the cargo van.

Therefore, from the foregoing, it should be understood that objects of this invention include the reduction of air drag on highway trucks and truck tractor-semitrailer combination vehicles which employ closed van type bodies. Further, that this drag reduction be accomplished by an apparatus which is adjustable to fit a variety of vehicles with differing sizes, shapes, and conditions of use.

BRIEF DESCRIPTION OF THE DRAWINGS

In the drawings, where like numerals refer to like parts throughout:

FIG. 1 illustrates an air drag reducer of the present invention mounted above the roof of the cab of the truck tractor part of the vehicle.

FIG. 7 represents use of the present invention on a truck.

DESCRIPTION OF THE PREFERRED EMBODIMENT

The general problem which this invention solves is the waste of energy to overcome air drag by motor freight vehicles operating on open highways. Because of legal length limits, these vehicles have been designed as bluff bodies. Such bluff bodies generate whorls, eddies, and generally turbulent air flow patterns when moved through the air. The energy to create and sustain these disturbances in the air is provided by the vehicle; since the turbulence serves no useful purpose, the result is a waste of energy.

The present invention solves this problem by reducing the turbulence in the air flow patterns around the moving vehicle. It does this by acting as a detached forebody, effectively streamlining the entire vehicle.

Figure 1:
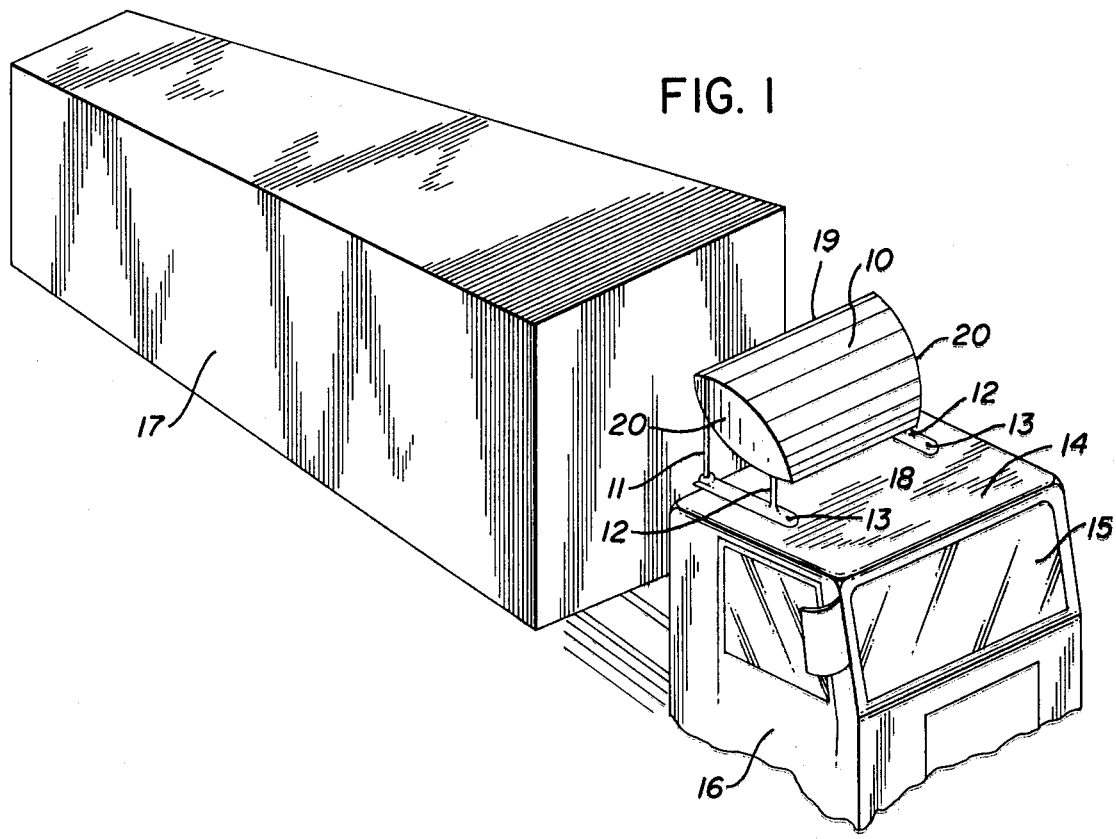
FIG. 1 is a perspective view of the upper portion of a truck tractor-semitrailer combination vehicle with a closed van type semitrailer body as viewed generally from a position in front of, above, and slightly to one side of said vehicle. This

Referring more particularly to the drawings, there is illustrated by FIG. 1 in airfoil 10 of the present invention mounted by rear struts 11 and front struts 12 to attach plate 13. These attach plates 13 are fastened to the roof 14 of the cab 15 of a motor freight vehicle. The rear struts 11 are extensible. The front struts 12 are also extensible. These struts 11 and 12 allow the airfoil 10 to be pivoted in the vertical plane. It is to be understood that these struts 11 and 12 create and control the dimensions of a gap between the cab roof 14 and the airfoil 10.

The motor vehicle illustrated by FIG. 1 is comprised of a truck tractor 16 and a closed van type of semitrailer 17.

The airfoil 10 of the preferred embodiment of the present invention has a short straight leading edge 18 and a longer straight trailing edge 19. This trailing edge 19 of the preferred embodiment is approximately three-fourths as long as the van body of a typical highway motor freight vehicle is wide. The preferred embodiment of the airfoil 10 has tips 20 which are smoothly curved and convexedly contoured to join its upper front and lower rear surfaces. The upper front surface of the preferred embodiment of the airfoil 10 is slightly convex. The lower rear surface of the preferred embodiment of the airfoil 10 has a large convexity. The present invention may be constructed of metal; the preferred embodiment is fabricated by adhesively joining interior reinforced upper front and lower rear shells of fiberglass reinforced plastic at their peripheral extremities. Metal and fiberglass reinforced plastic struts 11 and 12 and attach plates 13 are also used in the preferred embodiment of the present invention.

Figure 2:
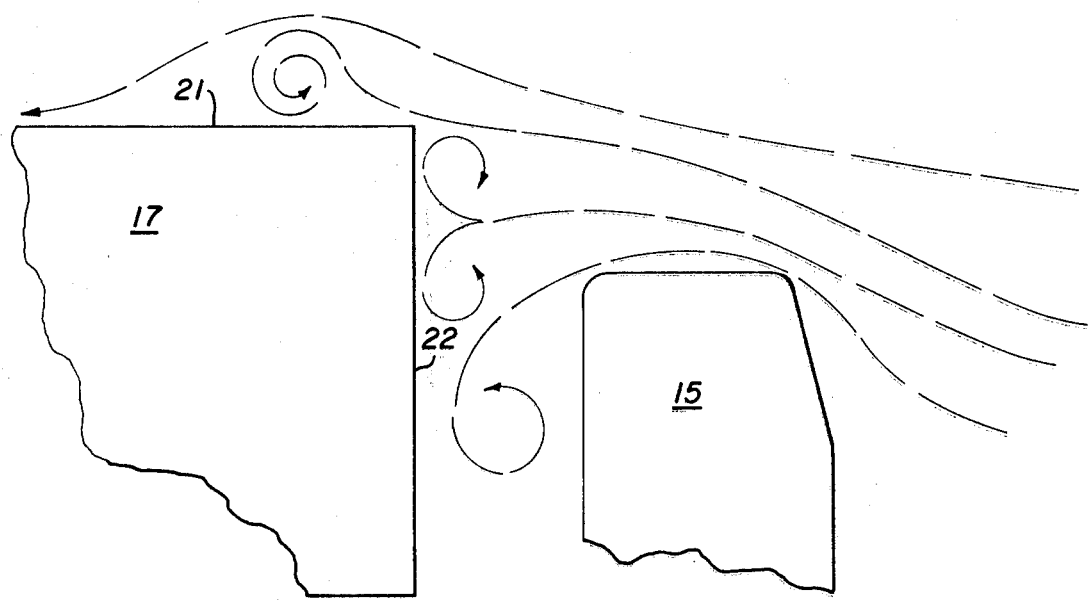
FIG. 2 is a fragmentary side elevation of the upper portion of a typical truck tractor-semitrailer combination vehicle, where the closed van semitrailer has vertical dimensions substantially greater than those of the truck tractor.

FIG. 2 illustrates some of the most important regions of vigorous air turbulence around a typical highway truck tractor-semitrailer combination vehicle. In particular, air flow separation occurs at the sharp edge where the roof 21 and the front face 22 of the van body meet. Experiments both in wind tunnels and on full-scale vehicles have shown that the air very close to the surface of the roof 21 just behind this edge moves forward relative to a forward-moving vehicle. Thus, there is an eddy in the air at this location. This is illustrated by the dashed spiral line above the roof 21 of the van body. Aft of this region, the air returns to laminar flow, attached to the surface of the vehicle. In FIG. 2 and in subsequent Figures, the air flow patterns are illustrated as they would appear to a stationary observer at a wind tunnel, where the vehicle is also stationary and the air flows past it; it has been amply demonstrated that these air flow patterns are essentially the same as those obtained when an air mass is stationary and a vehicle moves through it.

Also represented in FIG. 2 by sharply-curved dashed lines is the region of high dynamic pressure at the exposed flat front face 22 of the typical closed van used for carrying motor freight.

Although regions of turbulence also exist at other places around the typical motor freight vehicle, these are generally smaller and/or weaker than the two (one on the top, the other at the front of the van) which are illustrated in FIG. 2. For example, there are smaller and weaker regions of turbulence at each side of the vans bodies, near the front, similar to that shown above the roof 21. These require much less energy to create and sustain than the one on top; this is partly because the horizontal dimensions of the cab 15 and semitrailer van 17 are typically less dissimilar than the vertical dimensions, and partly because the edges where the van front face 22 meets the sides are usually rounded.

Figure 3:
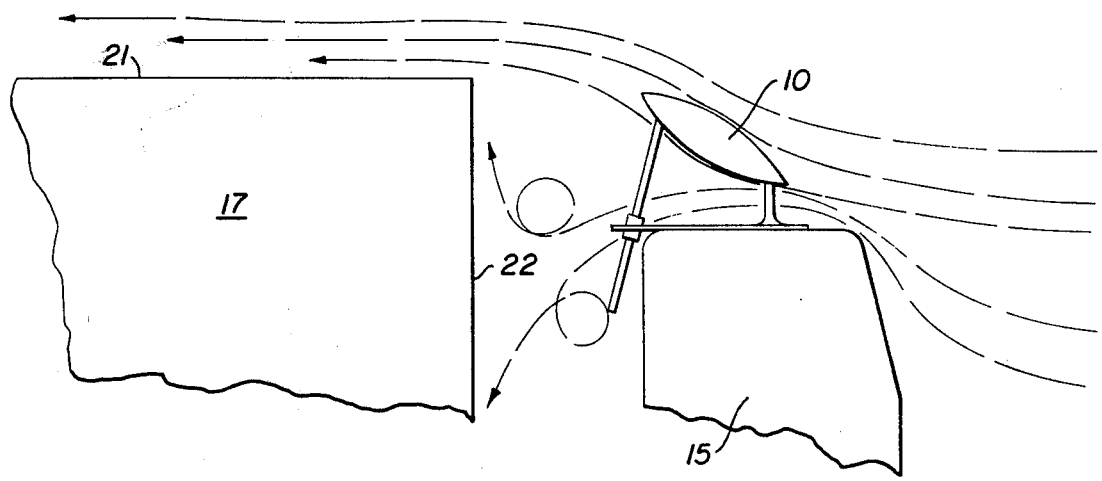
FIG. 3 is a view similar to that of FIG. 2 but showing an airfoil of the present invention mounted above the roof of the cab of the truck tractor portion of the vehicle.

FIG. 3 illustrates the effect of installing the present invention on the principal air flow patterns around the same typical truck tractor-semitrailer illustrated in FIG. 2. In FIG. 3, it is seen that the airfoil 10 guides much air upward, high over the cab 15 so that when it reaches the edge between the top 21 and the front 22 of the van body it has little or no vertical velocity. The air flow is thus laminar; the energy necessary to sustain the eddy shown in this region in FIG. 2 is saved when the present invention is used as in FIG. 3.

Also shown in FIG. 3 is the weakening of the eddies in the gap between the rear of the cab 15 and the van body front face 22. This is due mostly to the upward component of velocity imparted to some of the air as it tends to follow the contour of the lower rear surface of the airfoil 10. It is also partly due to the weak tip vortices generated by the extreme upper rear tips of the airfoil 10. Together, these effects cause a reduction in the dynamic pressure at the front face of the van, further reducing air drag.

Figure 4:
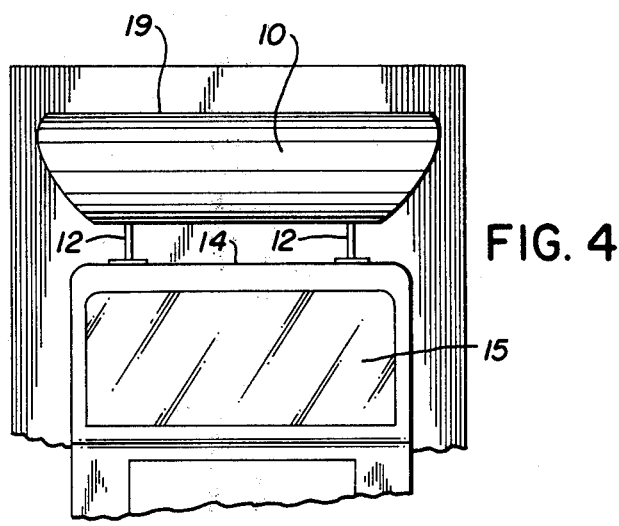
FIG. 4 is a fragmentary front elevation of the vehicle and invention shown in FIGS. 1 and 3.

FIG. 4 is a fragmentary front elevation of a cab 15 and a closed van type body 23 with the preferred embodiment of the present invention mounted above the cab roof 14. This view shows the front struts 12. The airfoil 10 is shown as it would be typically adjusted for maximum drag reduction, with its trailing edge located approximately three-fourths of the vertical distance from the cab roof 14 to the van roof 21.

Figure 5:
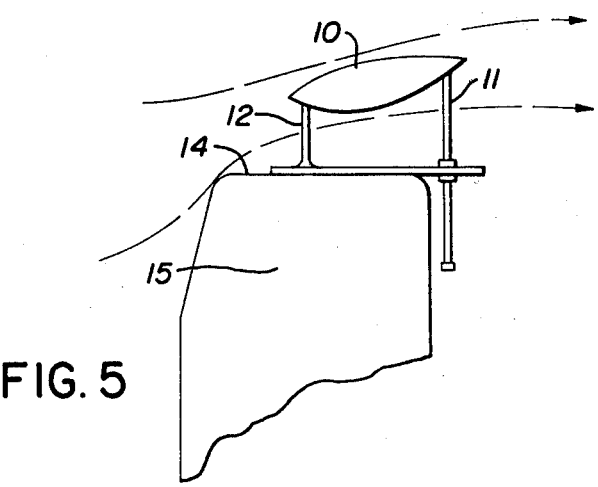
FIG. 5 is a fragmentary side elevation of a truck tractor with an air drag reducer of the present invention attached to the roof of the cab of said vehicle.

FIG. 5 is a fragmentary side elevation of a typical truck tractor 16 with the preferred embodiment of the present invention mounted above the cab roof 14 and adjusted for travel either with no semitrailer or with a flat bed or similar low bodied semitrailer. The airfoil 10 is rotated by adjusting the struts 11 and 12 so that it presents an edge-on aspect to the wind Thus, as illustrated by the dashed lines, the air flow patterns are not changed appreciably from those occurring when such a vehicle is driven with no such device at all installed. The use of the present invention on existing truck tractors thus does not penalize them by increasing their air drag when they are driven with either no semitrailer or with a semitrailer having other than a van type body.

Figure 6:
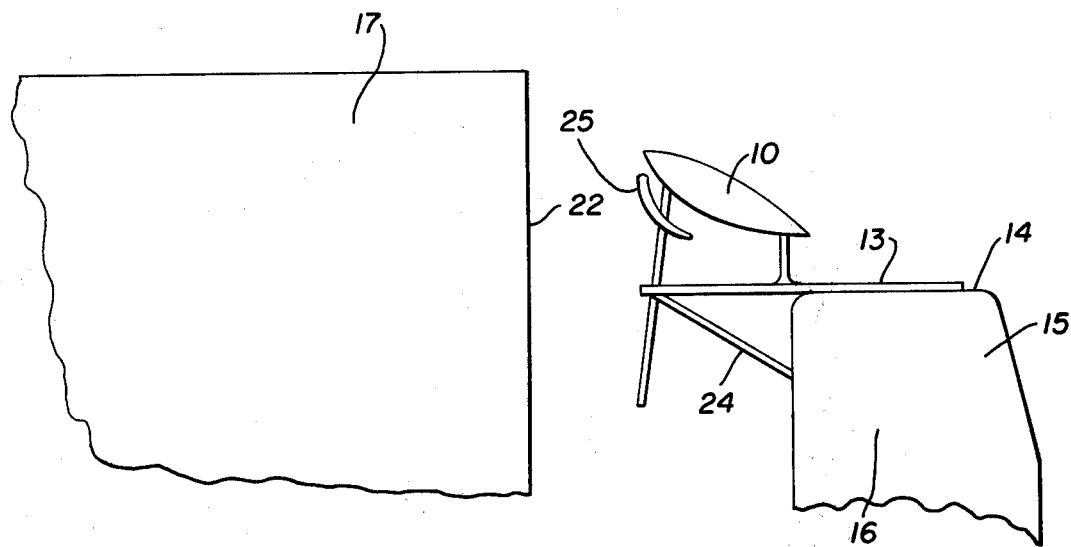
FIG. 6 is a view similar to that of FIG. 3 except that a substantially larger gap exists between the rear surface of the cab of the truck tractor and the front face of the van body of the semitrailer than that shown in FIG. 3.

FIG. 6 is a fragmentary side elevation of a typical truck tractor-semitrailer combination vehicle having a large gap between the rear of the truck tractor cab 15 and the front face 22 of the closed van semitrailer 17. Such a large gap is often used by West Coast truckers. One version of the preferred embodiment of the present invention is shown mounted above and behind the roof 14 of the cab 15 of this vehicle. To provide maximum drag reduction with such a large gap between the truck tractor 16 and the semitrailer 17, the airfoil 10 is mounted further to the rear than for the more usual gap. To do this, the attack plates 13 are extended in length and have rear support legs 24 added. This version of the preferred embodiment of the present invention also employs an auxiliary airfoil 25 to form the equivalent of a wing slot; this auxiliary airfoil 25 is much smaller and thinner than the airfoil 10; it would be constructed of materials similar to those of the main airfoil 10 and would be located fixedly a few inches away from the main airfoil 10 at the place with the shortest radius of curvature of the lower rear surface of the main airfoil 10. At this location, this slot would maintain attached flow over this lower rear surface of the main airfoil 10.

Figure 7:
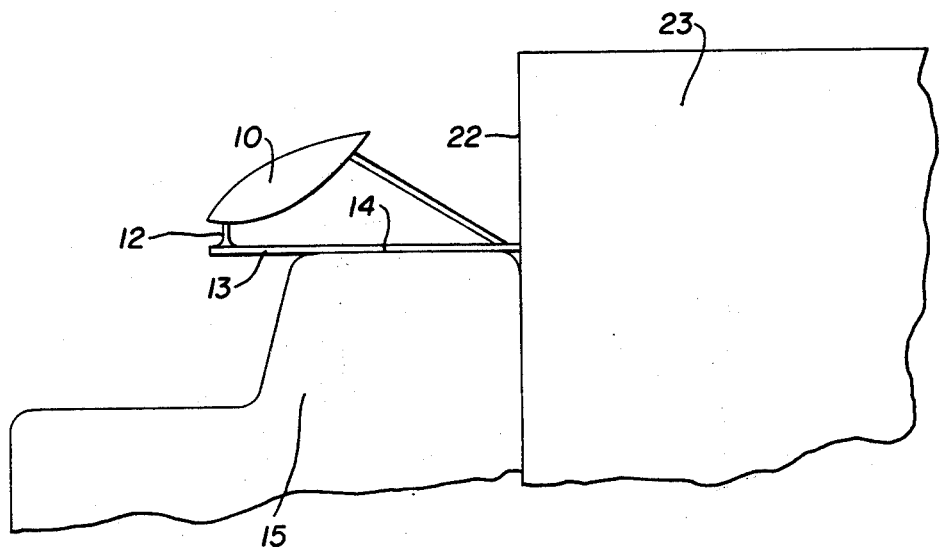
FIG. 7 is a view similar to that of FIG. 3 except that little or no gap exists between the rear surface of the cab and the front face of the van body of this vehicle; thus.

FIG. 7 is a fragmentary side elevation of a truck with a van body 23. The rear of the cab 15 and the front face 22 of the body 23 of such a truck typically have little or no gap between them. One version of the preferred embodiment of the present invention is shown mounted above the roof 14 of the cab 15 of this truck. The attach plates 13 are modified to allow the airfoil 10 to be mounted further forward than for the usual gap in truck tractor-semitrailer combination vehicles. The front struts 12 are also shortened for this truck installation.

I claim as my invention:

1. Apparatus for reducing air drag on highway trucks and truck tractor-semitrailer combination vehicles which have closed van type bodies, said apparatus comprising: a rigid airfoil with a smooth slightly convex upper front surface and a very convex lower rear surface, straight leading and trailing edges, with the leading edge being shorter than the trailing edge, said trailing edge being as a minimum three-fourths as long as the closed van type body is wide, said airfoil having smoothly rounded tips; an assemblage of struts and plates which secure the airfoil adjustably above the cab roof of the vehicle, holding the airfoil so that its leading and trailing edges are perpendicular to the centerline of the vehicles cab, the plates being attached to the cab roof and the struts defining a gap between the airfoil and the cab roof, these struts being adjustable in their lengths so that this gap dimension and shape may be changed.

* * * * *